(12) United States Patent
Halfant

(10) Patent No.: US 6,801,710 B1
(45) Date of Patent: Oct. 5, 2004

(54) METHODS AND APPARATUS FOR SMOOTH REVERSE PLAYBACK OF MPEG ENCODED MEDIA

(75) Inventor: Matthew D. Halfant, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 899 days.

(21) Appl. No.: 09/714,863

(22) Filed: Nov. 16, 2000

(51) Int. Cl.$^7$ ............................. H04N 5/91; H04N 7/26
(52) U.S. Cl. ............................ 386/68; 386/111; 386/67
(58) Field of Search ............................. 386/68, 67, 69, 386/70, 81, 82, 109, 111, 112, 27, 33, 124, 125, 126, 105, 106, 6, 7, 40, 45; H04N 5/91, 7/26

(56) References Cited

U.S. PATENT DOCUMENTS 5,923,811 A * 7/1999 Kawamura et al. ........... 386/65
6,353,700 B1 * 3/2002 Zhou ........................... 386/68
6,751,400 B1 * 6/2004 Matsumura et al. .......... 386/68

* cited by examiner

Primary Examiner—Robert Chevalier
(74) Attorney, Agent, or Firm—Beyer Weaver & Thomas, LLP

(57) ABSTRACT

A method and an apparatus for performing the method of decoding and playing in reverse MPEG encoded content. The MPEG encoded content comprises a plurality of pictures frames. The picture frames are comprised of one or more picture frame types selected from the group of picture frame types including I-frames, P-frames, and B-frames. The method and the apparatus for performing the method comprise the steps of obtaining a group of MPEG picture frames ("GOP"), determining the total number of picture frames in the GOP, and setting an index value equal to the total number of picture frames in the GOP. Next, a picture frame F that has a display order equal to the index value is decoded and displayed, and the earliest B-frame that depends upon frame F is determined. All the B-frames that depend upon frame F are decoded and displayed from highest display order to lowest display order, and the index value then is set to a value equal to one less than the display order of the earliest B-frame that depends upon frame F. The process then repeats by obtaining, decoding and displaying the next frame F having a display order equal to the index value, and decoding and displaying the B-frames that depend upon the frame F.

11 Claims, 2 Drawing Sheets

METHODS AND APPARATUS FOR SMOOTH REVERSE PLAYBACK OF MPEG ENCODED MEDIA

BACKGROUND OF THE INVENTION

The present invention relates generally to methods and apparatus for reverse playback of MPEG encoded media, and more particularly to a novel method and systems for performing the method that allows for the smooth reverse playback of MPEG encoded media without skipping frames.

MPEG streams are encoded as a series of interdependent frames. There are three basic frame types: I, P, and B. I-frames and P-frames are collectively known as reference frames, because other frames may depend upon them for their reconstruction. B-frames are always dependent, but no frame is in turn dependent upon them. Specifically, the dependency rules are as follows:

I-frames are completely self contained, and may be decoded without reference to any other frame;

P-frames are dependent upon the immediately preceding reference frame, which may be an I-frame or another P-frame; and B-frames depend upon a pair of reference frames, one immediately preceding it, the other immediately following it, in normal display order.

Because of the dependencies, the MPEG frames typically are presented in a stream having an order slightly different from the output display order. For example, an MPEG stream might begin I1-P2-B3-B4, and would be decoded in the order given. That is because P2 depends upon I1, and both B3 and B4 depend upon both I1 and P2. But the intended display order may be I1-B3-B4-P2, with the B-frames being displayed between the flanking reference frames upon which they depend. Because of these dependencies, typical MPEG decoders usually comprise at least three buffers for holding decoded images: a pair of reference frames are retained so that a third frame—a B-frame—can be decoded before being displayed. Three buffers generally are sufficient.

Playing video in reverse, as is provided in most DVD players, and other MPEG players, such as some video-on-demand (VOD) systems and the like, presents an immediate difficulty. Consider a hypothetical case, posed for clarity of explanation:

"Suppose an MPEG sequence is presented from a DVD with only one I-frame followed by 5 P-frames: I1-P2-P3-P4-P5-P6. In this case, each frame depends upon its predecessor and the decode order and forward display order are identical. How would we this sequence be played in reverse?"

Reverse order means displaying, first P6, then P5, and so on, down to P2, and then finally I1. But P6 cannot be decoded without first decoding P5, which in turn requires that P4 be decoded, and so on. In fact, all 6 frames must be decoded before the reverse display process can begin. This is not a problem if the DVD player includes 6 display buffers, but because the example presented herein is simplistic, it will be assumed that only 3 display buffers—which suffice for forward playback—are available.

During the reverse playback operation of the above example, the buffers first are filled with I1, P2, and P3. To decode P4, however, a value in one of the buffers must be overwritten. Either I1 or P2 can be overwritten, but P3 must remain in a buffer in order to decode P4. By the time P6 is to be decoded, the buffers will contain P4, P5, and P6, which then can be displayed in reverse order: P6, then P5, then P4. After doing this, I1, P2, and P3 will need to be re-decoded before they can be displayed: P3, then P2, then I1.

Note that in this example, each of the first three frames had to be decoded twice. With longer dependent sequences, the amount of redundant decoding further increases; for example, if there are 8 P-frames instead of 5, then the first three frames would be decoded three separate times, while the second three would be decoded twice. This shows why it is generally difficult to implement a smooth reverse play on MPEG players. The goal is to display frames in reverse order at the normal rate of 30 frames per second, but the excessive re-decoding, which is required by the DVD and other MPEG players of the prior art as illustrated above, makes it very difficult to keep up with that rate. Thus, with the prior art MPEG players, to recover the time lost in re-decoding frames, the players typically omit frames from the reverse playback sequence, which leads to reverse playback at accelerated speeds. One particularly simple strategy is to decode and display only the independent I-frames, which leads to especially fast reverse playback, but poor motion quality.

Thus, what is needed is a system and method for playing MPEG encoded media in reverse at the forward playback speed (i.e., 30 frames/second) without sacrificing motion quality or smoothness by skipping some of the frames while playing the video in reverse.

SUMMARY OF THE INVENTION

A method and an apparatus for performing the method of decoding and playing in reverse MPEG encoded content. The MPEG encoded content comprises a plurality of pictures frames. The picture frames are comprised of one or more picture frame types selected from the group of picture frame types including I-frames, P-frames, and B-frames. The method and the apparatus for performing the method comprise the steps of obtaining a group of MPEG picture frames ("GOP"), determining the total number of picture frames in the GOP, and setting an index value equal to the total number of picture frames in the GOP. Next, a picture frame F that has a display order equal to the index value is decoded and displayed, and the earliest B-frame that depends upon frame F is determined. All the B-frames that depend upon frame F are decoded and displayed from highest display order to lowest display order, and the index value then is set to a value equal to one less than the display order of the earliest B-frame that depends upon frame F. The process then repeats by obtaining, decoding and displaying the next frame F having a display order equal to the index value, and decoding and displaying the B-frames that depend upon the frame F.

In accordance with another embodiment of the present invention, the step of decoding and displaying a picture frame F comprises first decoding each picture frame upon which frame F depends. In addition, the step of decoding and displaying a picture frame F comprises determining which slot in a decode buffer should be used to hold the next frame to be decoded by determining which slot in the decode buffer holds a frame FR with the earliest display sequence.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Figure 1:
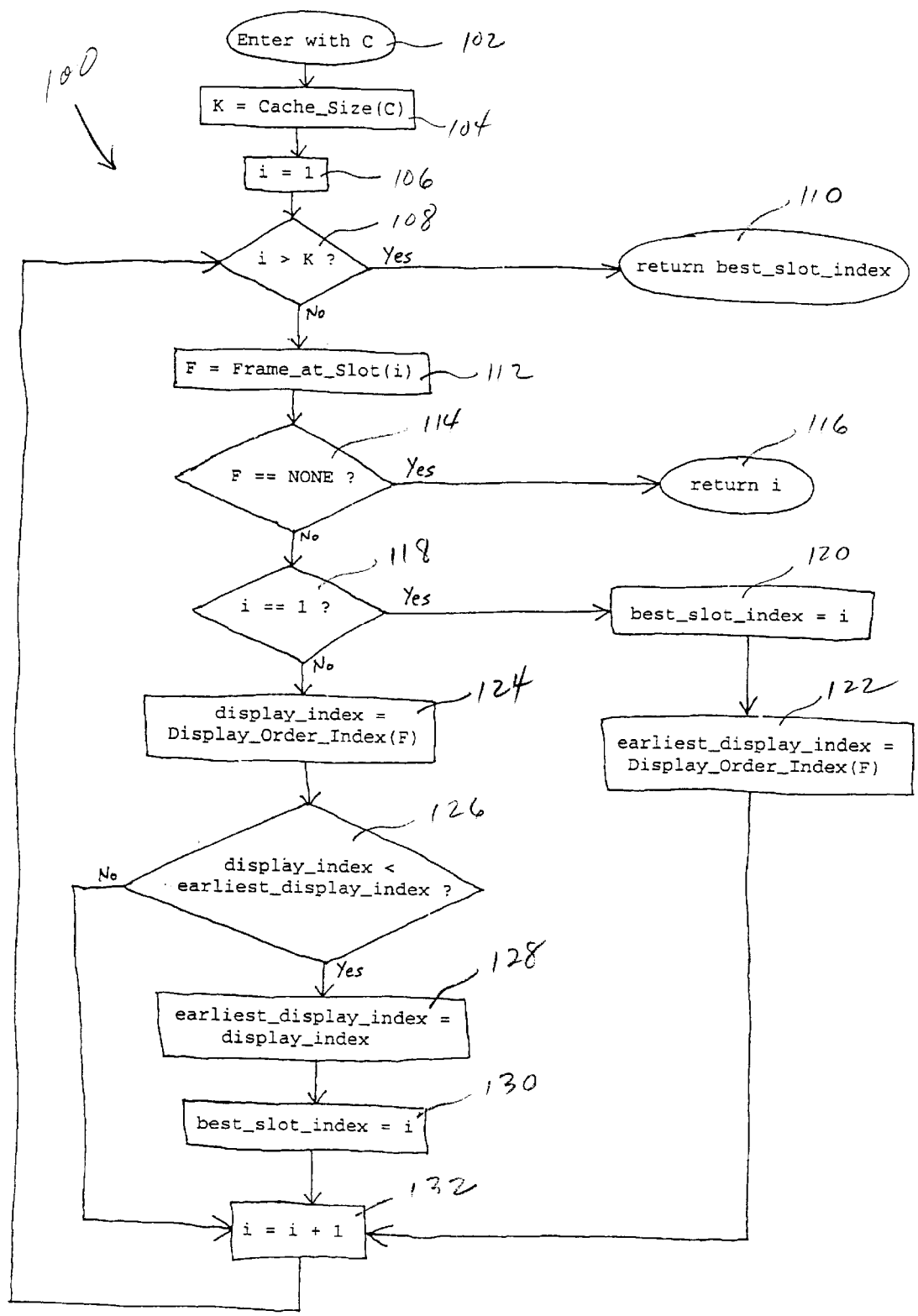
FIG. 1 is a flow diagram illustrating a method in accordance with one embodiment of the present invention for selecting a preferred decode buffer to use.

The present invention relates to a system and method for playing MPEG encoded media in reverse, and more particularly to a method for the efficient use of limited display buffers, to allow smooth playback of media in the reverse direction. The reverse playback of the present invention is considered "smooth" because no frames are dropped, and they are displayed at normal speed—only in reverse order. This also sometimes is referred to as "slow reverse playback," because it is slower than the reverse playback speeds normally available on DVD and other media players. The present invention is described herein with reference to DVD players playing MPEG video (and audio). However, one skilled in the art will appreciate that the system and method of the present invention can be used in any device, which decodes and plays MPEG encoded media. For example, a set-top box or server responsible for playing video-on-demand content may embody the present invention. Also, any type of computer system that is configured to play MPEG encoded media may embody the present invention. Therefore, the present invention is not limited to DVD players. In addition, the term MPEG, as used herein, shall mean any and suitable compression format, such as MPEG-1, MPEG-2, MPEG-4, or any other compression format hereinafter developed. The term MPEG media shall mean any media content that can be encoded in a compressed digital format, such as MPEG. The content can be video content, audio content, or any other suitable data content.

With MPEG media, data is presented as a "Group of Pictures" ("GOP"), which typically is presented in forward, normal play mode, but which also can be played in reverse. In describing the present invention, MPEG frames will be designated in the form Fn.m: where F is the frame type (either I, P, or B); where n is an integer giving the frame's decode sequence position; and where m is an integer giving the frame's display sequence position.

One embodiment of a method of the present invention for playing MPEG media in reverse will be presented in the form of an example. The example presented herein will use the GOP set forth below. The example is presented in the notation Fn.m:

TABLE 1

| Frame | Frame Type | Decode Order | Display Order |
| --- | --- | --- | --- |
| I1.1 | I-frame | 1 | 1 |
| P2.4 | P-frame | 2 | 4 |
| B3.2 | B-frame | 3 | 2 |
| B4.3 | B-frame | 4 | 3 |
| P5.6 | P-frame | 5 | 6 |
| B6.5 | B-frame | 6 | 5 |
| I7.9 | I-frame | 7 | 9 |
| B8.7 | B-frame | 8 | 7 |
| B9.8 | B-frame | 9 | 8 |
| P10.11 | P-frame | 10 | 11 |
| B11.10 | B-frame | 11 | 10 |
| P12.14 | P-frame | 12 | 14 |
| B13.12 | B-fraem | 13 | 12 |
| B14.13 | B-frame | 14 | 13 |
| P15.15 | P-frame | 15 | 15 |

Changing the order around, the reverse playback display order for this example is as follows:

TABLE 2

| Reverse Playback Order | Frame Decode/Playback Notation |
| --- | --- |
| P.15 | P15.15 |
| P.14 | P12.14 |
| B.13 | B14.13 |
| B.12 | B13.12 |
| P.11 | P10.11 |
| B.10 | B11.10 |
| I.9 | I7.9 |
| B.8 | B9.8 |
| B.7 | B8.7 |
| P.6 | P5.6 |
| B.5 | B6.5 |
| P.4 | P2.4 |
| B.3 | B4.3 |
| B.2 | B3.2 |
| I.1 | I1.1 |

In the example presented herein, when only a single integer index is given without a decimal point, it denotes the decode order of the GOP, for example, I1, P2, B3, B4, P5, etc. If a single integer index is given with a decimal point, it denotes the display order, for example, I.1, B.2, B.3, P.4, etc.

As stated above, the frame dependency rules are as follows:

(1) an I-frame has no dependency;

(2) a P-frame is dependent upon the reference frame (i.e., either a P-frame or an I-frame) that most-closely precedes it in decode order;

(3) a B-frame is dependent upon the closest preceding and following reference frames, in display order.

Given a GOP, for example the GOP in Table 1, the following information can be determined for any frame, F:

(a) which, if any, frame precedes F in normal display order, on which F depends (hereinafter referred to as Preceding_Dependency(F)); and (b) which, if any, frame follows F in normal display order, on which F depends (hereinafter referred to as Following_Dependency(F)).

Each of these operations applied to a particular frame F may return either the identity of the sought-after frame, or an indication that no such frame exists. If no frame exists, the value NONE is used. Thus, if F is an I-frame, then both these operations will return NONE, since an I-frame depends on no other frame in either direction. For P-frames, the Following_Dependency(F) operation will always return NONE, since only a preceding dependency exists for P-frames.

An example of these values for frames from the GOP defined in Table 1 is as follows:

Preceding_Dependency(B3.2) returns I1.1

Following_Dependency(B3.2) returns P2.4

Preceding_Dependency(P2.4) returns I1.1

Following_Dependency(P2.4) returns NONE

Preceding_Dependency(I7.9) returns NONE

Following_Dependency(I7.9) returns NONE

A full table of dependencies is shown below in Table 3, which is most easily constructed visually after sorting the frames into display order.

TABLE 3

| F | Preceding_Dependency(F) | Following_Dependency(F) |
|---|---|---|
| I1.1 | NONE | NONE |
| B3.2 | I1.1 | P2.4 |
| B4.3 | I1.1 | P2.4 |
| P2.4 | I1.1 | NONE |
| B6.5 | P2.4 | P5.6 |
| P5.6 | P2.4 | NONE |
| B8.7 | P5.6 | I7.9 |
| B9.8 | P5.6 | I7.9 |
| I7.9 | NONE | NONE |
| B11.10 | I7.9 | P10.11 |
| P10.11 | I7.9 | NONE |
| B13.12 | P10.11 | P12.14 |
| B14.13 | P10.11 | P12.14 |
| P12.14 | P10.11 | NONE |
| P15.15 | P12.14 | NONE |

Another parameter that is useful for presenting the systems and methods of the present invention is the parameter Earliest_Dependent_BFrame(F). This parameter only applies to reference frames (I and P), and returns the first B-frame, in normal display order, that depends upon F. The B-frame will precede F in display order, but follow it in decode order. As with the dependency operators defined above, Earliest_Dependent_BFrame(F) can return NONE to signify that there is no B-frame that depends upon frame F.

Table 4 illustrates the Earliest_Dependent_BFrame(F) parameter for each of the reference frames in the GOP from Table 1. In Table 4, the frames are sorted into display order for ease of interpretation. (Note: the operator indeed can be applied to B-frame arguments, but the return value is NONE in such cases. Therefore, the Earliest_Dependent_BFrame is not shown for B-frames.)

TABLE 4

| F | Earliest_Dependent_BFrame(F) |
|---|---|
| I1.1 | NONE |
| B3.2 | |
| B4.3 | |
| P2.4 | B3.2 |
| B6.5 | |
| P5.6 | B6.5 |
| B8.7 | |
| B9.8 | |
| I7.9 | B8.7 |
| B11.10 | |
| P10.11 | B11.10 |
| B13.12 | |
| B14.13 | |
| P12.14 | B13.12 |
| I15.15 | NONE |

The GOP consists of a series of pictures, also called frames, which are not decoded. If the GOP consisted entirely of I-frames, which have no dependencies, then forward or reverse play would be trivial. Due to dependencies, even normal (forward) play requires a cache of at least 3 frame buffers, into which decoded frames are stored.

In accordance with one embodiment of the present invention, to decode a group of pictures (GOP) in MPEG format, any number K of frame buffers can be used. However, as indicated previously, K should be greater than or equal to 3. Efficient use of the frame buffer cache is important to smooth reverse playback. Thus, in accordance with one embodiment of the present invention, three principles for managing frame buffers may be used. The buffer management (BM) principles are as follows:

BM1: Do not decode a frame until it is necessary to do so.
BM2: Free up a frame buffer at the earliest opportunity.
BM3: When it is necessary to overwrite a frame buffer before its contents have been used, select the buffer whose decoded frame has the earliest display order index.

BM1 means, for example, that early B-frames, which do not contribute to the decoding of the final frames that must be displayed first, will be skipped. This principle helps minimize re-decoding operations, and is a buffer management issue in that that it preserves the buffers for essential contents. Principle BM2 reduces the need to overwrite decoded frames that then will have to be re-decoded subsequently. Principle BM3 follows from the fact that reverse playback requires working backwards in the display sequence, and the earliest display order buffer is the last one needed.

Buffer management principle BM3 is illustrated in a flowchart 100 in FIG. 1. Flowchart 100 illustrates one embodiment of a method for selecting the best buffer slot of a cache C to use (denoted Best_Slot_to_Use(C)), where C represents the cache of K frame buffers. For the Best_Slot_to_Use(C) method of the present invention, it is assumed that each slot of C is either empty or contains a decoded frame, F. Thus, Frame_at_Slot (i), where i runs from 1 to K, either returns a frame, F, or NONE (to indicate the empty state). For each returned frame, F, the decode and display order indices can be obtained using the operators Decode_Order_Index(F) and Display_Order_Index(F), respectively.

Still referring to FIG. 1, the method illustrated in flowchart 100 will be described in more detail. Specifically, to determine the best slot to use, the subroutine is entered with a cache C (step 102). Next, a variable K is set to the cache size of C (step 104), and a variable i is set to 1 (step 106). Then, the subroutine checks to determine if i is greater than K (step 108). For the first iteration, i equals 1, and K is at least 3, so the subroutine moves to the next step, where a variable F is set to the decoded frame that is stored in slot i of the cache buffer (step 112). If there is no frame in the slot i of the cache buffer, F is set to NONE.

After the variable F is set (either to a frame value or to NONE), the subroutine checks to determine if the variable F comprises the value NONE (step 114). If there is no frame in the particular cache location check (F==NONE), the subroutine returns slot location i as a viable slot into which a frame can be decoded (step 116). If there is a frame in slot location i (F!=NONE), then the subroutine checks to see if i equals 1 (step 118). If i equals 1, then the variable best_slot_index is initialized to i(best_slot_index=i =1) (step 120), and the variable earliest_display_index is set to the display order index of the decoded frame stored in variable F (earliest_display_index=Display_Order_Index (F)) (step 122). Then, i is incremented (i=i+1) (step 132), and the subroutine returns to step 108, for the next iteration.

If at step 118, i is not equal to 1, the subroutine sets the variable display_index to the display order index of the decoded frame stored in variable F (display_index=Display_Order_Index(F)) (step 124). Next, the value of variable display_index is checked to see if it is smaller than the value of variable earliest_display_index (step 126). If it is not, the variable earliest_display_index stays the same, i is incremented (i=i+1) (step 132), and the subroutine returns to step 108, for the next iteration.

If at step 126, the value of variable display_index is less than the value of variable earliest_display_index, the variable earliest_display_index is set to the value of the variable display_index (step 128), and the variable best_slot_index is set to i. Explained in a different way, if the frame in cache buffer slot i has a display order less than the earliest_display_index, the earliest_display_index is set to that lower display order value, and the buffer slot i is set as the best_slot_index. Then i is incremented (i=i+1), and the subroutine continues until each cache buffer slot is checked, or an empty buffer slot is found. The examples set forth below will illustrate the method in more detail.

C-like pseudo-code for flowchart 100 illustrated in FIG. 1 is as follows:

TABLE 5

```
index Best_Slot_to_Use(C)
{
    K = Cache_Size (C); // number of buffers in cache
    for (i = 1; i < K; i++) {
        F = Frame_at_Slot(i) ;
        if (F == NONE)
            return i;   // return the first empty slot, if any
        // else...
        if (i == 1) { // first one examined
            best_slot_index = i ;
            earliest_display_index = Display_Order_Index(F) ;
        }
        else {
            display_index = Display_Order_Index(F) ;
            if (display_index < earliest_display_index) {
                earliest_display_index = display_index;
                best_slot_index = i ;
            }
        }
    }
    return best_slot_index;
}
```

The basic operation of buffer management principle BM1 ("do not decode a frame until it is necessary to do so") is recursive, because dependencies are recursive. For example, to carry out the reverse display indicated in Table 2, frame P.15 is displayed first. However, frame P.15 depends upon P.14, which therefore, should be decoded prior to frame P.15. This recursive operation can be applied to decoding any frame, including B-frames, without any assumption that their dependencies are already in the cache. In C-like pseudo-code, the routine is as follows, with the cache C being treated as a global:

```
Decode_Frame(F)
{
    if (Frame_Not_Already_In_Cache (F) ) { // else, nothing to do .
        // check that dependencies are already decoded
        F_Preceding = Preceding_Dependency(F) ;
        if (F_Preceding != NONE)
            Decode_Frame(F_Preceding) ; // recursive call
        F_Following = Following_Dependency(F) ;
        if (F_Following != NONE)
            Decode_Frame(F_Following) ; // recursive call
        // now get the best slot to use
        index = Best_Slot_to_Use(C) ;
        Decode_Frame_Into_Slot(F, C, index) ;
    }
}
```

Given a GOP, particular frames can be extracted from either the display order index or the decode order index. The indices will run from 1 to N, where N is the number of frames in the GOP:

N=Number_of_Frames(GOP)

The following shorthand notation will be convenient: for i between 1 and N, GOP[i] will denote the i'th frame in decode order, and GOP[.i] will denote the i'th frame in display order.

That is,

F=GOP[i] means that i=Decode_Order_Index(F)

while

F=GOP[.i] means that i=Display_Order_Index(F)

Figure 2:
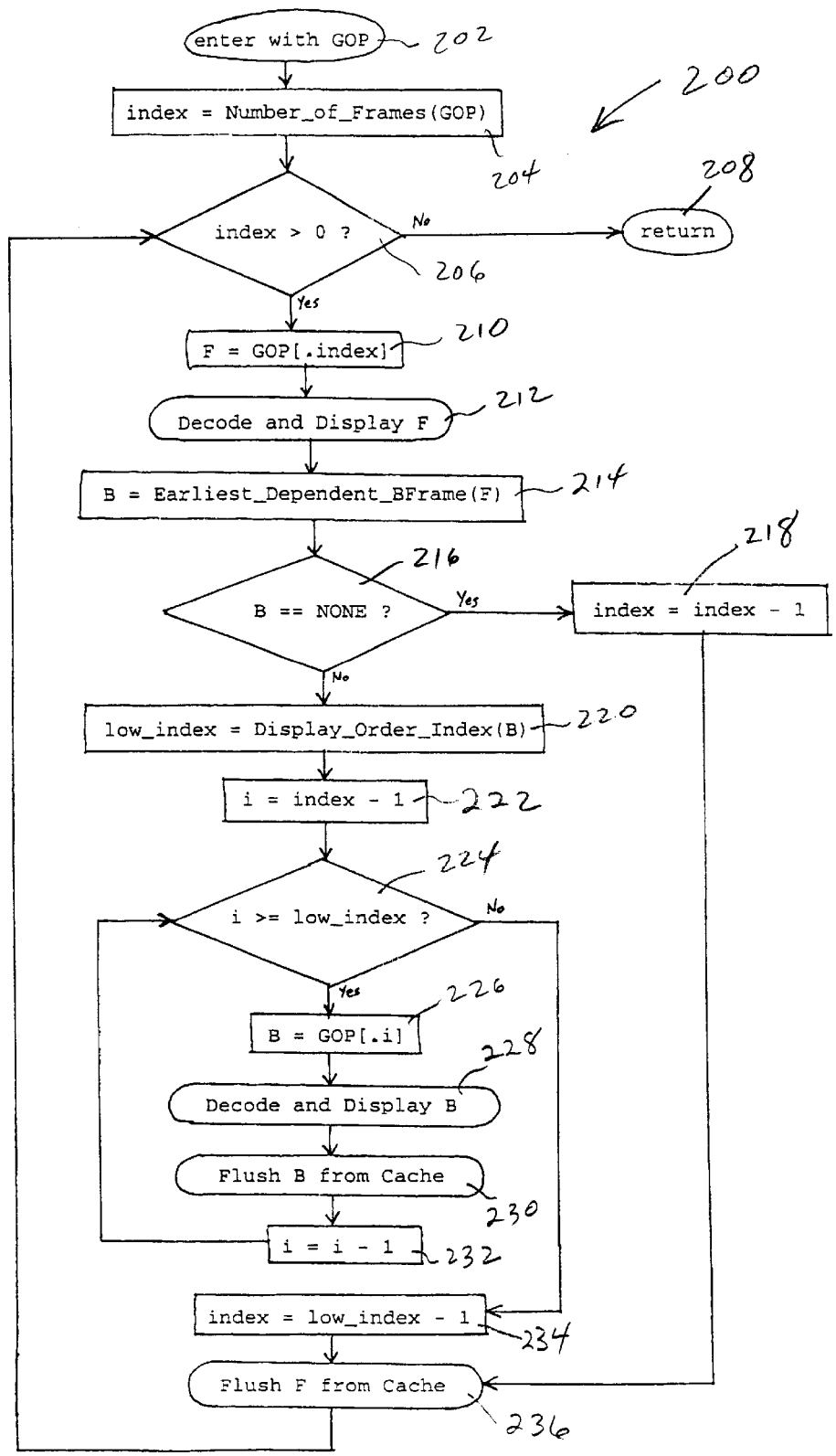
FIG. 2 is a flow diagram illustrating a method in accordance with one embodiment of the present invention for decoding and playing MPEG encoded media in reverse.

In terms of this notation, one embodiment of a method for reverse playback of a GOP is illustrated in flowchart 200 in FIG. 2.

The method of flowchart 200 can be described in words, as follows. The GOP is worked through backwards, starting with frame F=GOP[.index], where index is initialized to the total number of frames in the GOP. Frame F is decoded and displayed. Then, it is determined whether frame F has any dependent B-frames, which precede it and depend upon it. If not, then frame F is flushed from the cache (since it's no longer needed), and the index is decreased by 1. The loop continues while the index is positive.

If there are B-frames that depend upon frame F, then the B-frames are decoded, displayed, and flushed, in turn. Then frame F is flushed from the cache, and the index is set to 1 less than the index of the last B-frame displayed (which is the earliest dependent B-frame).

In accordance with one embodiment of the present invention, only one cache buffer is used for holding decoded B-frames; all the other frame buffers hold reference frames that are needed for subsequent decoding operations. Flowchart 200 will be described below in more detail by way of example.

The pseudo-code for the reverse playback method discussed above is:

```
Slow_Reverse_Play(GOP)
{
    index = Number_of_Frames(GOP) ;
    while (index > 0) {
        F = GOP [.index] ;
        Decode_Frame(F) ; // decode into frame buffer cache
        Display_Frame(F) ; // display decoded frame on TV
        B = Earliest_Dependent_BFrame(F) ;
        if (B != NONE) { // if there is a dependent B-frame
            low_index = Display_Order_Index(B) ; // get its index
            for (i = index-1; i >= low_index; i--) {
                B = GOP[.i] ;
                Decode_Frame(B) ;
                Display_Frame(B) ;
                Flush_Frame_From_Cache(B) ;
            }
            index = low_index - 1;
        }
        else {    // no dependent B-frame
            index--;   // simply decrement index by 1
        }
        // in either case, we are now done with F
        Flush_Frame_From_Cache(F) ;
    }
}
```

EXAMPLE 1

Still referring to FIGS. 1 and 2, an example of the operation of the Slow Reverse Playback method as applied to the GOP shown in Table 2 now will be presented. This particular example will use a cache of only three frame buffers, which is the minimum number of buffers that typically is required for normal (forward) playback. The example also will be presented below in which four frame buffers are used, and, as one skilled in the art will appreciate, the method can apply to any number of frame buffers in a cache.

As illustrated in FIG. 2, the reverse playback method is entered with a group of pictures (GOP) (step 202), and then the index is set to 15, the number of frames in the GOP (index=Number_of_Frames(GOP)=15) (step 204). Next, the index is checked to determine if it is greater than 0 (step 206). In this case the index is 15, so the next step to be processed is step 210.

Loop Iteration 1:

Frame F is set to the frame that has a display order equal to the index (step 210). In the case in which the index is 15, F=P.15. Next, frame F is decoded and displayed (step 212). To decode and display frame F, the subroutine Decode_Frame(F) is called. The subroutine Decode_Frame(F) is a recursive operation, which first decodes all the frames upon which frame F depends. For example, in the present example, decoding P.15 requires first decoding P.14; decoding P.14 requires first decoding P.11; and decoding P.11 requires first decoding I.9, which has no dependencies. Thus, frame I.9 first should be decoded, then frame P.11, then P.14, and then P.15. After decoding the first three frames, the cache comprises the following values:

slot 1: I.9 slot 2: P.11 slot 3: P.14

At this point, a slot in the decode buffer is needed to decode frame P.15. Subroutine Best_Slot_to_Use(C) is called to determine which slot in the decode buffer should be overwritten with frame P.15.

As discussed above, the Best_Slot_to_Use(C) subroutine is illustrated in flowchart 100 in FIG. 1. To determine the best slot to use, the subroutine is entered with a cache C, which has 3 buffer slots in this example (step 102). Next, K is set to 3, the size of cache C (step 104), and the variable i is set to 1 (step 106). Next, the subroutine checks to determine if i is greater than K (step 108). At this point in the routine, i=1, and K=3, so i clearly is not greater than K, and thus, the subroutine continues to step 112. At step 112, F is set to the decoded frame that is stored in slot i of the cache buffer. If there is no frame in the cache buffer location checked, F is set to NONE. In this particular example, the frame in slot 1 of the cache buffer is I.9, so F=I.9.

After the variable F is set (either to a frame value or to NONE), the subroutine checks to determine if the variable F comprises the value NONE (step 114). If F=NONE, it means that there is no frame in that cache location, so the subroutine returns slot location i as a viable slot into which a frame can be decoded (step 116). If there is a frame in slot location i (F!=NONE), then the subroutine checks to see if i=1 (step 118).

In accordance with the example being presented herein, i currently is 1, so the variable best_slot_index is set to 1 (step 120). In addition, F=I.9, so the variable earliest_display_index is set to 9, which is the display order of frame I.9 (step 122). Next, i is incremented (i=i+1=2) (step 132) and the subroutine returns to the top (step 108).

For the next iteration, i=2 and K=3, so the routine continues by setting F to the value P.11 (the decoded frame in slot 2 of the buffer) (step 112). F does not equal NONE, and i does not equal 1 (check at step 118), so the variable display_index is set to 11 (the display order of frame F=P.11) (step 124). Since variable display_index is 11 and the variable earliest_display_index is 9, the subroutine increments i (i=i+1=3) (step 132) and then returns to the top (step 108). The process continues by checking buffer location 3. Buffer location 3 has the frame P.14 stored in it, so F is set to P.14 (step 112), and the variable display_index is set to 14, which is the display order for frame P.14 (step 124). Again, since the display_index(14) is greater than the earliest_display_index(9), the variables earliest_display_index and best_slot_index do not change.

Next, i is incremented (i=i+1=4) (step 132) and the routine returns to the top (step 108). Since i (4) is greater than K (3), the subroutine ends by returning the best_slot_index value of 1. This means that frame P.15 should decoded in slot 1, writing over frame I.9 currently in slot 1. Thus, frame I.9 eventually will need to be re-decoded. The cache now comprises the following values:

slot 1: P.15 slot 2: P.11 slot 3: P.14

After frame P.15 is decoded, it is displayed (step 212). Next, the system sets the variable B equal to Earliest_Dependent_BFrame(F) (step 214). Table 4, lists the Earliest_Dependent_BFrame(F) for all frame in the GOP of the present example. In this particular example B=NONE, as frame P.15 does not have any B frames dependant upon it. Thus, the index is decremented by 1 (index=index−1=14) (step 218), and frame P.15 is flushed from buffer location 1 (step 236). The cache now comprises the following values:

slot 1:

slot 2: P.11 slot 3: P.14

Loop Iteration 2:

The index now is 14. Frame F is set to the frame that has a display order equal to the index (step 210). In the case in which the index is 14, F=P.14.

Frame P.14 already is in the cache, so it does not need to be decoded. Frame P.14 is displayed (step 212), and then it is determined whether any B-frames depend upon frame P.14. In this case, as illustrated in Table 3, B.13 and B.12 both depend from frame P.14. As illustrated in Table 4, the Earliest_Dependent_BFrame(F) for F=P.14 is B.12. Thus, variable B is set to B.12 (step 214). Since B does not equal NONE, the variable low_index is set equal to the Display_Order_Index(B) (step 220). In this case, the Display_Order_Index(B) for B.12 is 12, so low_index is set to the value 12. Next, the variable i is set according to the formula: i=index−1 (step 222). In accordance with the present example, i=14−1=13.

Next, the i is compared with low_index to determine if i is greater than or equal to low_index (step 224). In accordance with this particular example, i=13, and low_index=12, so B is set to frame B.13 (B=GOP[.i]=B.13) (step 226). Next, frame B.13 is decoded and displayed (step 228). The sub-routine Decode_Frame(B) is used to determine which other frames need to be decoded in order to decode frame B.13. In this particular case, the preceding dependency for B.13 is P.11, and the following dependency for B.13 is P.14, both of which have already been decoded into the buffer. Since slot 1 is open, frame B.13 is decoded into slot 1 using its dependencies P.11 and P.14. The buffer now comprises:

slot 1: B.13 slot 2: P.11 slot 3: P.14

After being decoded, frame B.13 is displayed (step 228), and then flushed from the cache (step 230). The cache now comprises:

slot 1:

slot 2: P.11 slot 3: P.14

Next, i is decremented by 1 to 12 (step 232), and B.12 is decoded into the buffer (steps 224–228). As with frame B.13, the sub-routine Decode_Frame(B) is used to determine which other frames need to be decoded in order to decode frame B.12. Again, as with frame B.13, the preceding dependency for B.12 is P.11, and the following dependency for B.12 is P.14, both of which are still in the buffer. Since slot 1 is open, frame B.12 is decoded into slot 1 (step 228). The cache now comprises:

slot 1: B.12 slot 2: P.11 slot 3: P.14

Frame B.12 is displayed (step 228) and flushed (step 230). The cache now comprises:

slot 1:

slot 2: P.11 slot 3: P.14

Next, i is decremented by 1 to 11 (step 232). Since i now is less than low_index, which is 12, this run of B-frames is finished (step 224). Next, the index is set to 11 (index=low_index−1=11) (step 234), and frame P.14 is flushed from the cache buffer, since it already has been displayed, and no other frames depend upon it (step 236). The cache now comprises:

slot 1:

slot 2: P.11 slot 3:

Loop Interation 3:

Next, the subroutine returns to the top of the loop (step 206), where it checks whether index is greater than 0. Index=11, so F is set to P.11 (step 210). Frame P.11 already is in the cache, so it does not need to be decoded. Frame P.11 is displayed (step 212), and then it is determined whether any B-frames depend upon frame P.11, which one does (B.10) as illustrated in Table 3 (steps 214–216). As illustrated in Table 4, the Earliest_Dependent_BFrame(F) (the earliest B-frame that depends upon frame P.11) is B.10, so low_index is set to 10 (step 220), and i is set to the value index−1 (i=index−1=10) (step 222). Next, frame B.10 is decoded using the subroutine Decode_Frames(F) (step 226–228). The preceding dependency for frame B.10 is I.9, which is no longer in the cache. Thus, frame I.9 needs to be decoded. The following dependency for frame B.10 is P.11, which already is in the cache. The cache now comprises:

slot 1: I.9//second time decoding I.9 slot 2: P.11 slot 3: B.10

Frame B.10 is displayed (step 228) and then flushed (step 230). The variable i is decremented by 1, so that it now has the value 9 (step 232). The cache now comprises:

slot 1: I.9 slot 2: P.11 slot 3:

Since low_index is 10 and i is 9 (step 224), this run of dependent B-frames is finished. Next, the index is set to 9 (index=low_index−1=9) (step 234), and frame P.11 is flushed from the cache, since it already has been displayed and no other frames depend upon it (step 236). The cache now comprises:

slot 1: I.9 slot 2:

slot 3:

Loop Iteration 4:

Next, the subroutine returns to the top of the loop (step 206), where it checks whether index is greater than 0. Index=9, so F is set to I.9 (step 210). Frame I.9 already is in the cache, so it does not need to be decoded. Frame I.9 is displayed (step 212), and then it is determined whether any B-frames depend upon frame I.9, which two do (B.8 and B.7) as illustrated in Table 3 (steps 214–216). As illustrated in Table 4, the Earliest_Dependent_BFrame(F) (the earliest B-frame that depends upon frame I.9) is B.7, so low_index is set to 7 (step 220), and i is set to the value index−1 (i=index−1=8) (step 222). Next, frame B.8 needs to be decoded using the subroutine Decode_Frames(F) (step 226–228). As illustrated in Table 3, the preceding dependency for B.8 is P.6, the preceding dependency for P.6 is P.4, and the preceding dependency for P.4 is I.1. Thus, frames I.1, P.4, P.6 and B.8 need to be decoded in that order. When decoding the frames, the subroutine Best_Slot_to_Use(C) as discussed above preferably is used. Since the subroutine Best_Slot_to_Use(C) is discussed in great detail above, it will not be explained any further here, and only the results we be presented. Accordingly, frame I.1 is decoded into slot 2, and frame P.4 is decoded into slot 3. The cache now comprises:

slot 1: I.9 slot 2: I.1 slot 3: P.4

Next, frame P.6 is decoded into slot 2, since it contains the frame with the earliest display index. After decoding frame P.6 into slot 2, the cache now comprises:

slot 1: I.9 slot 2: P.6 slot 3: P.4

Next, frame B.8 is decoded into slot 3, overwriting frame P.4, the frame with earliest display index. The cache now comprises:

slot 1: I.9 slot 2: P.6 slot 3: B.8

Frame B.8 depends on preceding frame P.6 and following frame I.9, both of which are decoded in the cache. Therefore, B.8 is displayed (step 228) and flushed from the cache (step 230). The variable i is decremented by 1 (i=i−1=7) (step 232). Since frame B.7 has the same dependencies as frame B.8, no other frames need to be decoded to decode frame B.7. Accordingly, frame B.7 is decoded into slot 3 of the buffer (steps 224–228). The cache now comprises:

slot 1: I.9 slot 2: P.6 slot 3: B.7

Next, frame B.7 is displayed (step 228) and flushed (step 230), index is set to low_index−1 (index=low_index−1=6) (step 234), and frame I.9 is flushed from the buffer. The cache now comprises:

slot 1:

slot 2: P.6 slot 3:

Loop Iteration 5:

Next, the subroutine returns to the top of the loop (step 206), where it checks whether index is greater than 0. Index=6, so F is set to P.6 (step 210). Frame P.6 is already in the cache, so it is displayed (step 212). Frame P.6 has one B-frame that depends upon it (B.5). Decoding frame B.5 requires frame P.4 to be decoded, which requires frame I.1 to be decoded. Thus, frames I.1, P.4 and B.5 need to be decoded in succession. First, frame I.1 is decoded into slot 1 and frame P.4 is decoded into slot 3. Preferably, subroutines Decode_Frame(F) and Best_Slot_to_Use(C) are used to determine which frames are to be decoded into which slots. The cache now comprises:

slot 1: I.1//second time decoding I.1 slot 2: P.6 slot 3: P.4//second time decoding P.4

Next, frame B.5 is decoded into slot 1, writing over frame I.1, since it has the earliest display index. The cache now comprises:

slot 1: B.5 slot 2: P.6 slot 3: P.4

Frame B.5 is displayed (step 228) and flushed (step 230), index is set to low_index−1 (index=low_index−1=4) (step 234), and frame P.6 is flushed, since it already has been displayed, and no other frame depends upon in (step 236). The cache now comprises:

slot 1:

slot 2:

slot 3: P.4

Loop Iteration 6:

Next, the subroutine returns to the top of the loop (step 206), where it checks whether index is greater than 0. Index=4, so F is set to P.4 (step 210). Frame P.4 is already in the cache, so it is displayed (step 212). Frame P.4 has two B-Frames that depend upon it (B3 and B2). Decoding frame B.3 requires frames P.4 and I.1 to be decoded. Frame P.4 is already in the cache, so frame I.1 is decoded into slot 1 of the cache. Next, frame B.3 is decoded into slot 3 (step 228). The cache now comprises:

slot 1: I.1//third time decoding I.1 slot 2: B.3 slot 3: P.4

Next, frame B.3 is displayed (step 228) and flushed (step 230). The cache now comprises:

slot 1: I.1 slot 2:

slot 3: P.4

Next, frame B.2 is decoded (step 228). Frame B.2 has the same dependencies as B.3, which are already in the cache. The cache now comprises:

slot 1: I.1 slot 2: B.2 slot 3: P.4

Frame B.2 is displayed (step 228) and flushed (step 230), index is set to low_index−1 (index=low_index−1=1) (step 234) and frame P.4 is flushed from the cache (step 236). The final loop is entered with the cache comprising:

slot 1: I.1 slot 2:

slot 3:

Loop Iteration 7:

For the last iteration, the subroutine returns to the top of the loop (step 206), where it checks whether index is greater than 0. Index=1, so F is set to I.1 (step 210). Frame I.1 is already in the cache, so it is displayed (step 212). Frame I.1 has no dependent B-frames, so the index' is decremented by 1 (index=index−1=1−1=0) (step 218), and frame I.1 is flushed from the cache (step 236). At step 206, since index=0, the subroutine is done.

Summary: frames I.9 and P.4 were decoded twice, while frame I.1 was decoded three times. Thus, display 15 frames in reverse order using a three-slot cache, 4 extra decoding operations were needed for a total of 19. The inefficiency can be illustrated as 4/15=27%.

EXAMPLE 2

In this example, the same process will be followed, but it will be described in a more abbreviated fashion. In this particular example of the present invention, the frame-buffer cache comprises four slots instead of three.

Loop Iteration 1:

F=P.15

As above, the GOP of the present example should be decoded in the sequence: I.9, P.11, P.14, and then P.15. Following this sequence, the cache comprises:

slot 1: I.9 slot 2: P.11 slot 3: P.14 slot 4: P.15

Since P.15 has no dependent B-frames, it is simply displayed and flushed, and the index decremented by 1 to 14. Starting the second iteration, the cache comprises:

slot 1: I.9 slot 2: P.11 slot 3: P.14 slot 4:

Loop Iteration 2:

F=P.14

Frame P.14 is displayed. Then it is determined how may B-frames depend upon frame P.14. In this case frame P.14 has two dependent B-frames (B.13 and B.12). Both frames B.13 and B.12 depend upon frames P.14 and P.11, both of which are decoded in the cache. Thus, frame B.13 is decoded into available slot 4 of the buffer, displayed and then flushed. Next, the index is set to 12, and B.12 then is decoded into slot 4, displayed, and then flushed. P.14 then is flushed, and the index is set to low_index−1=12−1=11. Iteration 3 is entered with the cache comprising:

slot 1: I.9 slot 2: P.11 slot 3:

slot 4:

Loop Iteration 3:

F=P.11

Frame P.11 first is displayed. Then it is determined how many B-frames depend upon P.11. In this case, frame P.11 has one dependent B-frame, B.10, which depends from both P.11 and I.9, both of which are already decoded in the cache. Thus, B.10 is decoded into slot 3, displayed, and flushed, and then the index is set to low_index−1=9. Frame P.11 then is flushed, and iteration 4 is entered with the cache comprising:

slot 1: I.9 slot 2:

slot 3:

slot 4:

Loop Iteration 4:

F=I.9

Frame I.9 first is displayed. As with the other iterations, the next step is to determine how many B-frames depend upon frame I.9. In this case, I.9 has two dependent B-frames (B.8 and B.7). Both frames B.8 and B.7 depend upon frame I.9, which is already in the cache, and upon P.6, which needs to be decoded. The recursive dependencies for P.6 require the decoding sequence I.1, P.4, and then P.6. Thus the cache comprises:

slot 1: I.9 slot 2: I.1 slot 3: P.4
slot 4: P.6

Next, frame B.8 is decoded into slot 2, since I.1 has the earliest display order index. First, frame B.8 is decoded into slot 2, displayed, and then flushed. Next, frame B.7 is decoded into slot 2, displayed, and then flushed. After frame B.7 has been flushed, the index is set to low__index−1=6 and frame I.9 is flushed. Iteration 5 is entered with the cache comprising:

slot 1:
slot 2:
slot 3: P.4
slot 4: P.6

Loop Iteration 5:
F=P.6

Frame P.6 first is displayed, and then the dependent B-frames are determined. In this case P.6 has one dependent B-frame, B.5. Frame B.5 depends upon frames P.6 and P.4, both of which are already decoded into the cache buffer. Thus, B.5 is decoded into slot 1, displayed, and then flushed. Next, the index is set to 4, and frame P.6 is flushed. Iteration 6 is entered with the cache comprising:

slot 1:
slot 2:
slot 3: P.4
slot 4:

Loop Iteration 6:
F=P.4

Frame P.4 is displayed and the dependent B-frames are determined. Frame P.4 has two dependent B-frames, B.3 and B.2, both requiring the re-decoding of I.1. Thus, I.1 is decoded into the buffer, and the cache now comprises:

slot 1: I.1//decoded for the second time
slot 2:
slot 3: P.4
slot 4:

First frame B.3 is decoded into slot 2, displayed and flushed. Next, frame B.2 is decoded into slot B.2, displayed, and flushed. The index is set to 1, and frame P.4 is flushed from slot 3. The final iteration is entered with the cache comprising:

slot 1: I.1
slot 2:
slot 3:
slot 4:

Loop Iteration 7:
F=I.1

Frame I.1 is displayed and flushed. The subroutine is finished.

As illustrated by the second example, when 4 buffer slots are used, only frame I.1 is decoded twice. Thus, with 4 buffer slots, 16 decodes are needed to play 15 frames in reverse. The inefficiency is illustrated as 1/15=6.7%; much less than the inefficiency created by using only 3 buffer slots. Obviously, if 5 buffer slots are used, no frame will need to be decoded more than once, and the efficiency increases even more. As one skilled in the art will appreciate, a typical group of pictures has more than 15 frames, so some multiple decoding of frames may be needed. However, using the system and method of the present invention along with additional cache buffer slots will allow smooth reverse playback of MPEG encoded media.

CONCLUSION

In conclusion, the present invention provides a novel method and novel systems for implementing the method for smooth reverse playback of MPEG encoded media. While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for decoding and playing in reverse MPEG encoded content, said MPEG encoded content comprising a plurality of picture frames, said picture frames being of one or more picture frame types selected from a group of picture frame types including I-Frames, P-Frames, and B-Frames, said method comprising the steps of:

(A) obtaining a group of MPEG picture frames("GOP");
(B) determining a total number of picture frames in the GOP;
(C) setting an index value equal to the total number of picture frames in the GOP;
(D) decoding and displaying a picture frame F that has a display order equal to the index value;
(E) determining an earliest B-Frame in display order that depends upon the picture frame F;
(F) decoding and displaying from highest display order to lowest display order all B-Frames that depend upon picture frame F;
(G) setting the index value to a value equal to one less than the display order of the earliest B-Frame that depends upon picture frame F; and
(H) while the index value is greater than zero, repeating steps D through G.

2. The method as recited in claim 1, wherein step D comprises the step of first decoding each picture frame upon which frame F depends.

3. The method as recited in claim 1, wherein step D comprises determining which slot in a decode buffer should be used to hold the next frame to be decoded by determining which slot in the decode buffer holds a frame FR with the earliest display sequence.

4. The method as recited in claim 3, wherein said step of determining which slot in a decode buffer should be used, comprises:

(I) determining a number of slots in the decode buffer;
(J) setting a slot to be checked value to a first slot;
(K) comparing the slot to be checked value with the number of slots in the decode buffer;
(L) if the slot to be checked value is greater than the number of slots in the decode buffer, returning a best slot to be used;
(M) if the slot to be checked value is not greater than the number of slots in the decode buffer, checking a slot in the decode buffer equal to the slot to be check value for a frame FR;
(N) if there is no frame FR in the slot being checked, returning that slot as the best slot to be used;
(O) if there is a frame FR in the slot being checked, determining the display order of the frame FR and determining whether the slot to be checked value is equal to the first slot;
(P) if the slot to be checked value is equal to the first slot, setting a best slot to be used value to the slot to be checked value, setting an earliest display order value to the display order of frame FR, incrementing the slot to be checked value by 1, and returning to step K;

(Q) if the slot to be checked value is not equal to the first slot, performing the following steps;

(Q.1) setting a display order value to the display order of frame FR;

(Q.2) comparing the display order value with the earliest display order value;

(Q.3) if the display order value is less than the earliest display order value, setting the earliest display order value to the display order value, setting the best slot to be used value to the slot to be check value, incrementing the slot to be checked value by 1, and returning to step K;

(Q.4) if the display order value is not less than the earliest display order value, incrementing the slot to be check value by 1 and returning to step K.

5. The method as recited in claim 1, where step F comprises the steps:

(F.1) determining a display order of the earliest B-Frame that depends upon frame F, and setting a low display order value equal to the display order;

(F.2) setting a second index value equal to one less than the index value;

(F.3) comparing the second index value with the low display order value;

(F.4) if the second index value is not greater than or equal to the low display order value, setting the index value equal to one less than the low display order value, removing frame F from the memory position, and returning to step D;

(F.5) if the second index value is greater than or equal to the low display order value, performing the steps;

(F.5.a) retrieving into a memory position a B-Frame having a display order equal to the second index value;

(F.5.b) decoding and displaying the B-Frame;

(F.5.c) removing the B-Frame from the memory position; and (F.5.d) decrementing the second index value by one, and returning to step (F.3).

6. A method for decoding and playing in reverse MPEG encoded content, said MPEG encoded content comprising a plurality of picture frames, said picture frames being of one or more picture frame types selected from a group of picture frame types including I-Frames, P-Frames, and B-Frames, said method comprising the steps of:

(A) obtaining a group of MPEG picture frames("GOP");

(B) determining a total number of picture frames in the GOP;

(C) setting a first value to the total number of picture frames in the GOP;

(D) checking to determine if the first value is greater than zero; and if the first value is greater than zero, performing the steps;

(D.1) retrieving into a memory position, a picture frame F that has a display order equal to the first value;

(D.2) decoding and displaying picture frame F;

(D.3) determining an earliest B-Frame that depends upon picture frame F;

(D.4) if no B-Frame depends upon frame F, decrementing the first value by one, removing frame F from the memory position, and returning to step (D);

(D.5) if one or more B-Frames depend upon frame F, performing the steps;

(D.5.a) determining a display order of the earliest B-Frame that depends upon frame F, and setting a second value equal to the display order;

(D.5.b) setting a third value equal to one less than the first value;

(D.5.c) comparing the third value with the second value;

(D.5.d) if the third value is not greater than or equal to the second value, setting the first value equal to one less than the second value, removing frame F from the memory position, and returning to step D;

(D.5.e) if the third value is greater than or equal to the second value, performing the steps;

(D.5.e.i) retreiving into a memory position a B-Frame having a display order equal to the third value;

(D.5.e.ii) decoding and displaying the B-Frame;

(D.5.e.iii) removing the B-Frame from the memory position; and (D.5.e.iv) decrementing the third value by one, and returning to step (D.5.c).

7. An apparatus for decoding and playing in reverse MPEG encoded content, said MPEG encoded content comprising a plurality of picture frames, said picture frames being of one or more picture frame types selected from a group of picture frame types including I-Frames, P-Frames, and B-Frames, said apparatus comprising processing means for performing the steps:

(A) obtaining a group of MPEG picture frames("GOP");

(B) determining a total number of picture frames in the GOP;

(C) setting an index value equal to the total number of picture frames in the GOP;

(D) decoding and displaying a picture frame F that has a display order equal to the index value;

(E) determining an earliest B-Frame in display order that depends upon the picture frame F;

(F) decoding and displaying from highest display order to lowest display order all B-Frames that depend upon picture frame F;

(G) setting the index value to a value equal to one less than the display order of the earliest B-Frame that depends upon picture frame F; and (H) repeating steps D through G while the index value is greater than zero.

8. The apparatus as recited in claim 7, wherein step D comprises the step of first decoding each picture frame upon which frame F depends.

9. The apparatus as recited in claim 7, wherein step D comprises determining which slot in a decode buffer should be used to hold the next frame to be decoded by determining which slot in the decode buffer holds a frame FR with the earliest display sequence.

10. The apparatus as recited in claims 9, wherein said step of determining which slot in a decode buffer should be used, comprises:

(I) determining a number of slots in the decode buffer;

(J) setting a slot to be checked value to a first slot;

(K) comparing the slot to be checked value with the number of slots in the decode buffer;

(L) if the slot to be checked value is greater than the number of slots in the decode buffer, returning a best slot to be used;

(M) if the slot to be checked value is not greater than the number of slots in the decode buffer, checking a slot in the decode buffer equal to the slot to be check value for a frame FR;

(N) if there is no frame FR in the slot being checked, returning that slot as the best slot to be used;

(O) if there is a frame FR in the slot being checked, determining the display order of the frame FR and determining whether the slot to be check value is equal to the first slot;

(P) if the slot to be checked value is equal to the first slot, setting a best slot to be used value to the slot to be checked value, setting an earliest display order value to the display order of frame FR, incrementing the slot to be checked value by 1, and returning to step K;

(Q) if the slot to be checked value is not equal to the first slot, performing the following steps;

(Q.1). setting a display order value to the display order of frame FR;

(Q.2) comparing the display order value with the earliest display order value;

(Q.3) if the display order value is less than the earliest display order value, setting the earliest display order value to the display order value, setting the best slot to be used value to the slot to be check value, incrementing the slot to be checked value by 1, and returning to step K;

(Q.4) if the display order value is not less than the earliest display order value, incrementing the slot to be check value by 1 and returning to step K.

11. The apparatus as recited in claim 7, where step F comprises the steps:

(F.1) determining a display order of the earliest B-Frame that depends upon frame F, and setting a low display order value equal to the display order;

(F.2) setting a second index value equal to one less than the index value;

(F.3) comparing the second index value with the low display order value;

(F.4) if the second index value is not greater than or equal to the low display order value, setting the index value equal to one less than the low display order value, removing frame F from the memory position, and returning to step D;

(F.5) if the second index value is greater than or equal to the low display order value, performing the steps;

(F.5.a) retreiving into a memory position a B-Frame having a display order equal to the second index value;

(F.5.b) decoding and displaying the B-Frame;

(F.5.c) removing the B-Frame from the memory position; and (F.5.d) decrementing the second index value by one, and returning to step (F.3).

\* \* \* \* \*

UNITED STATES PATENT AND TRADEMARK OFFICE
CERTIFICATE OF CORRECTION

PATENT NO. : 6,801,710 B1
DATED : October 5, 2004
INVENTOR(S) : Matthew D. Halfant It is certified that error appears in the above-identified patent and that said Letters Patent is hereby corrected as shown below:

<u>Column 18,</u>
Line 14, change "(D.5.e.i) retreiving" to -- (D.5.e.i) retrieving --.

<u>Column 20,</u>
Line 17, change "(F.5.a) retreiving" to -- (F.5.a) retrieving --.

Signed and Sealed this

Third Day of May, 2005

JON W. DUDAS
*Director of the United States Patent and Trademark Office*